United States Patent
Taki (10) Patent No.: US 12,496,028 B2
(45) Date of Patent: Dec. 16, 2025

(54) RADIATION IMAGE PROCESSING DEVICE, RADIATION IMAGE PROCESSING METHOD, AND RADIATION IMAGE PROCESSING PROGRAM

(71) Applicant: FUJIFILM CORPORATION, Tokyo (JP)

(72) Inventor: Tomoko Taki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 94 days.

(21) Appl. No.: 18/320,797

(22) Filed: May 19, 2023

(65) Prior Publication Data
US 2023/0404510 A1 Dec. 21, 2023

(30) Foreign Application Priority Data
Jun. 21, 2022 (JP) ................. 2022-099859

(51) Int. Cl.
*A61B 6/00* (2024.01)
*A61B 6/50* (2024.01)

(52) U.S. Cl.
CPC ............ *A61B 6/505* (2013.01); *A61B 6/5282* (2013.01); *A61B 6/5294* (2013.01)

(58) Field of Classification Search
CPC ..... A61B 6/505; A61B 6/5282; A61B 6/5294; A61B 6/5235; A61B 6/4266; A61B 6/4452; A61B 6/482
See application file for complete search history.

(56) References Cited

U.S. PATENT DOCUMENTS

| | | | |
|---|---|---|---|
| 2014/0093043 A1* | 4/2014 | Nakatsugawa | A61B 6/58 378/62 |
| 2015/0131784 A1* | 5/2015 | Tajima | G01T 1/1603 378/97 |
| 2015/0189194 A1* | 7/2015 | Tajima | H04N 5/32 378/62 |
| 2016/0140720 A1* | 5/2016 | Naito | A61B 6/5211 382/132 |
| 2018/0028139 A1 | 2/2018 | Kuwabara | |
| 2018/0122094 A1 | 5/2018 | Naito | |
| 2021/0128094 A1* | 5/2021 | Taki | A61B 6/461 |

FOREIGN PATENT DOCUMENTS

JP 2015-043959 A 3/2015
JP 2018-015453 A 2/2018

* cited by examiner

*Primary Examiner* — Michael J Carey
*Assistant Examiner* — Zainab Mohammed Aldarraji
(74) *Attorney, Agent, or Firm* — Studebaker Brackett PLLC (57) ABSTRACT

In a case of deriving a subtraction image in which a specific tissue in a subject is extracted, the subtraction image being derived by performing weighting subtraction on a plurality of radiation images acquired by imaging the subject with radiation having different energy distributions and being subjected to predetermined image processing, a reaching dose which is a radiation dose that directly reaches a radiation detector that acquires the radiation image is acquired, and the subtraction image is derived by performing the image processing based on the reaching dose.

9 Claims, 9 Drawing Sheets

RADIATION IMAGE PROCESSING DEVICE, RADIATION IMAGE PROCESSING METHOD, AND RADIATION IMAGE PROCESSING PROGRAM

CROSS REFERENCE TO RELATED APPLICATIONS

The present application claims priority from Japanese Patent Application No. 2022-099859, filed on Jun. 21, 2022, the entire disclosure of which is incorporated herein by reference.

BACKGROUND

Technical Field

The present disclosure relates to a radiation image processing device, a radiation image processing method, and a radiation image processing program.

Related Art

In the related art, energy subtraction processing using two radiation images obtained by irradiating a subject with two types of radiation having different energy distributions by utilizing attenuation amounts of transmitted radiation different from each other depending on a substance configuring the subject has been known. The energy subtraction processing is a method in which pixels of the two radiation images obtained as described above are associated with each other, and the pixels are multiplied by an appropriate weight coefficient and then subtracted to acquire an image in which a specific structure included in the radiation image is extracted.

In addition, a method of estimating a bone density of a subject by correcting a bone part image representing a bone part of the subject acquired by energy subtraction processing by using a correction coefficient set based on a body thickness and a tube voltage of the subject has been proposed (see JP2015-043959A). In addition, in order to improve an image quality of the radiation image, a method of removing a scattered ray component of radiation included in a radiation image using a body thickness of a subject has also been proposed (see JP2018-15453A).

Here, in the methods disclosed in JP2015-043959A and JP2018-15453A, the body thickness of the subject used for the correction of the bone part image and the removal of the scattered ray is derived based on a reaching dose that directly reaches the radiation detector and a reaching dose that is transmitted through the subject. The reaching dose that directly reaches the radiation detector is calculated based on imaging conditions, such as a tube voltage (kV), a dose (mAs), and a distance between the radiation source and the radiation detector (source-to-image receptor distance (SID)).

By the way, the sensitivities of a tube of radiation and the radiation detector that generates the radiation image, which are used in a radiography apparatus, by detecting the radiation transmitted through the subject are degraded with time. In a case in which the tube and the radiation detector are degraded, the imaging conditions set in the radiography apparatus deviate from set values. In a case in which the imaging conditions deviate from the set values, in the method disclosed in JP2015-043959A, since the tube voltage and the body thickness are changed, the correction coefficient is changed, and as a result, the bone density cannot be estimated with high accuracy. In addition, in the method disclosed in JP2018-15453A, the scattered ray component cannot be removed with high accuracy. As described above, in a case in which the bone density cannot be estimated with high accuracy or the scattered ray component cannot be removed with high accuracy, the image quality of the acquired image is not stable.

SUMMARY OF THE INVENTION

The present disclosure has been made in view of the above circumstances, and is to enable making an image quality of an image derived by energy subtraction processing stable.

The present disclosure relates to a radiation image processing device that derives a subtraction image in which a specific tissue in a subject is extracted, the subtraction image being derived by performing weighting subtraction on a plurality of radiation images acquired by imaging the subject with radiation having different energy distributions and being subjected to predetermined image processing, the radiation image processing device comprising at least one processor, in which the processor acquires a reaching dose which is a radiation dose that directly reaches a radiation detector that acquires the radiation image, and derives the subtraction image by performing the image processing based on the reaching dose.

Note that, in the radiation image processing device according to the present disclosure, the processor may acquire the plurality of radiation images, derive a body thickness distribution of the subject based on the reaching dose, any of the plurality of radiation images, and an imaging condition in a case in which the plurality of radiation images are acquired, remove a scattered ray component of radiation scattered by the subject from the plurality of radiation images based on the body thickness distribution and the imaging condition, derive a bone part image in which a bone part of the subject is extracted, by performing the weighting subtraction on the plurality of radiation images from which the scattered ray component is removed, derive a correction coefficient for correcting a pixel value of the bone part image based on the body thickness distribution and the imaging condition, and derive the subtraction image by correcting the bone part image with the correction coefficient.

In addition, in the radiation image processing device according to the present disclosure, the processor may acquire the plurality of radiation images, derive a body thickness distribution of the subject based on the reaching dose, any of the plurality of radiation images and an imaging condition in a case in which the plurality of radiation images are acquired, remove a scattered ray component of radiation scattered by the subject from the plurality of radiation images based on the body thickness distribution and the imaging condition, and derive the subtraction image by performing the weighting subtraction on the plurality of radiation images from which the scattered ray component is removed.

In addition, in the radiation image processing device according to the present disclosure, the processor may acquire the plurality of radiation images, derive a body thickness distribution of the subject based on the reaching dose, any of the plurality of radiation images, and an imaging condition in a case in which the plurality of radiation images are acquired, derive a bone part image in which a bone part of the subject is extracted, by performing the weighting subtraction on the plurality of radiation images, derive a correction coefficient for correcting a pixel value of the bone part image based on the body thickness distribution and the imaging condition, and derive the subtraction image by correcting the bone part image with the correction coefficient.

In addition, in the radiation image processing device according to the present disclosure, the processor may acquire a tube voltage output by a tube voltage sensor that measures a tube voltage applied to a radiation source that emits the radiation, as one of the imaging conditions.

In addition, in the radiation image processing device according to the present disclosure, the processor may acquire a signal value output by an image sensor in a direct radiation region in the radiation detector in which the radiation directly reaches, as the reaching dose.

In addition, in the radiation image processing device according to the present disclosure, the processor may acquire a signal value output by a dose sensor installed in a direct radiation region in the radiation detector in which the radiation directly reaches, as the reaching dose.

In addition, in the radiation image processing device according to the present disclosure, the processor may acquire a signal value output by a dose sensor installed outside a region in the radiation detector in which the radiation is detected, as the reaching dose.

The present disclosure relates to a radiation image processing method of deriving a subtraction image in which a specific tissue in a subject is extracted, the subtraction image being derived by performing weighting subtraction on a plurality of radiation images acquired by imaging the subject with radiation having different energy distributions and being subjected to predetermined image processing, the radiation image processing method comprising acquiring a reaching dose which is a radiation dose that directly reaches a radiation detector that acquires the radiation image, and deriving the subtraction image by performing the image processing based on the reaching dose.

The present disclosure relates to a radiation image processing program causing a computer to execute a procedure of deriving a subtraction image in which a specific tissue in a subject is extracted, the subtraction image being derived by performing weighting subtraction on a plurality of radiation images acquired by imaging the subject with radiation having different energy distributions and being subjected to predetermined image processing, the radiation image processing program causing the computer to execute a procedure of acquiring a reaching dose which is a radiation dose that directly reaches a radiation detector that acquires the radiation image, and a procedure of deriving the subtraction image by performing the image processing based on the reaching dose.

According to the present disclosure, it is possible to make the image quality of the image derived by the energy subtraction processing stable.

DETAILED DESCRIPTION

Figure 1:
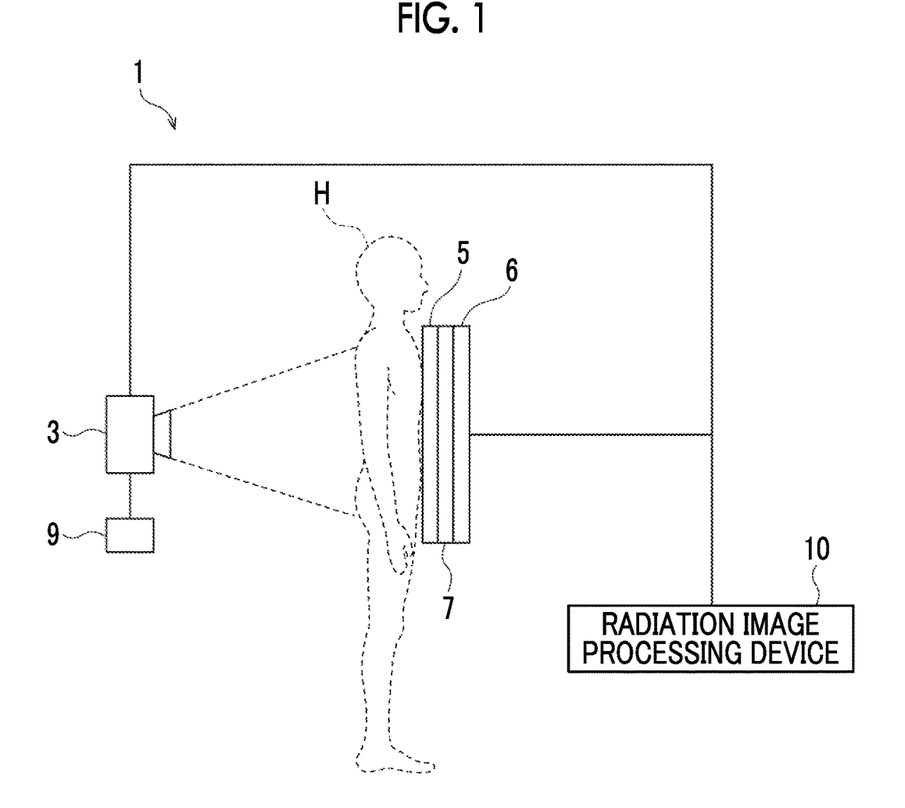
FIG. 1 is a schematic block diagram showing a configuration of a radiography system to which a radiation image processing device according to a first embodiment of the present disclosure is applied.

In the following description, an embodiment of the present disclosure will be described with reference to the drawings. FIG. 1 is a schematic block diagram showing a configuration of a radiography system to which a radiation image processing device according to a first embodiment of the present disclosure is applied. As shown in FIG. 1, the radiography system according to the first embodiment comprises an imaging apparatus 1 and a radiation image processing device 10 according to the first embodiment.

The imaging apparatus 1 is an imaging apparatus for performing energy subtraction by a so-called one-shot method for converting radiation, such as X-rays, emitted from a radiation source 3 and transmitted through a subject H into energy and irradiating a first radiation detector 5 and a second radiation detector 6 with the converted radiation. During imaging, as shown in FIG. 1, the first radiation detector 5, a radiation energy conversion filter 7 made of a copper plate or the like, and the second radiation detector 6 are disposed in order from a side closest to the radiation source 3, and the radiation source 3 is driven. Note that the first and second radiation detectors 5 and 6 are closely attached to the radiation energy conversion filter 7.

As a result, in the first radiation detector 5, a first radiation image G1 of the subject H by low-energy radiation also including so-called soft rays is acquired. In addition, in the second radiation detector 6, a second radiation image G2 of the subject H by high-energy radiation from which the soft rays are removed is acquired. The first and second radiation images G1 and G2 are input to the radiation image processing device 10.

The first and second radiation detectors 5 and 6 are configured by disposing a large number of image sensors. The first and second radiation detectors 5 and 6 can perform recording and reading-out of the radiation image repeatedly.

A so-called direct-type radiation detector that directly receives emission of the radiation and generates an electric charge may be used, or a so-called indirect-type radiation detector that converts the radiation into visible light and then converts the visible light into an electric charge signal may be used. In addition, as a method for reading out a radiation image signal, it is desirable to use a so-called thin film transistor (TFT) readout method in which the radiation image signal is read out by turning a TFT switch on and off, or a so-called optical readout method in which the radiation image signal is read out by emission of read out light. However, other methods may also be used without being limited to these methods.

Note that, in the first embodiment, as will be described below, some image sensors of the radiation detectors 5 and 6 are substituted with dose sensors.

In the imaging apparatus 1, in a case in which the first radiation image G1 and the second radiation image G2 are acquired, imaging conditions, such as a tube voltage, an imaging dose, a radiation quality, a source image receptor distance (SID) which is a distance between the radiation source 3 and surfaces of the first and second radiation detectors 5 and 6, a source object distance (SOD) which is a distance between the radiation source 3 and a surface of the subject H, and the presence or absence of a scattered ray removal grid are set.

The SOD and the SID are used to calculate a body thickness distribution as described below. It is preferable that the SOD be acquired by, for example, a time of flight (TOF) camera. It is preferable that the SID be acquired by, for example, a potentiometer, an ultrasound range finder, a laser range finder, or the like.

The imaging conditions are subjected to the calibration in advance such that a set value for the imaging apparatus 1 matches an actual output. For example, the calibration is performed such that an output corresponding to the set values set for the imaging apparatus 1 with respect to the imaging dose and the tube voltage can be obtained. In addition, the radiation detectors 5 and 6 are also subjected to the calibration such that a set signal value is output in a case in which a set dose of radiation is emitted. The setting of the imaging conditions is performed by the input from the input device 15 by an operator.

Moreover, in the first embodiment, the imaging apparatus 1 is provided with a tube voltage sensor 9 for measuring a tube voltage applied to the radiation source 3. A signal output by the tube voltage sensor is input to the radiation image processing device 10.

Figure 2:
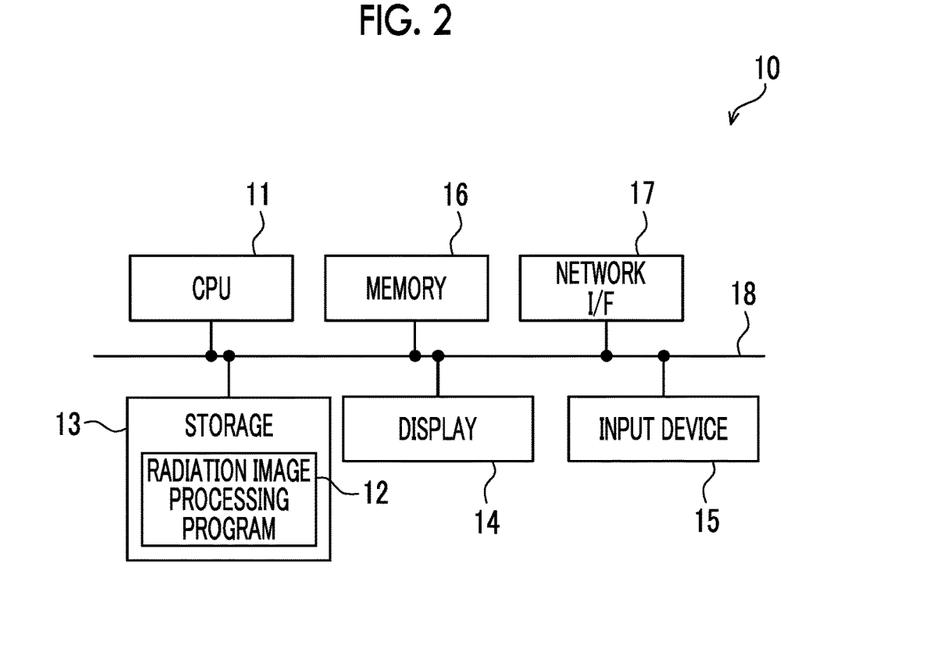
FIG. 2 is a diagram showing a schematic configuration of the radiation image processing device according to the first embodiment.

Hereinafter, the radiation image processing device according to the first embodiment will be described. First, with reference to FIG. 2, a hardware configuration of the radiation image processing device according to the first embodiment will be described. As shown in FIG. 2, the radiation image processing device 10 is a computer, such as a workstation, a server computer, and a personal computer, and comprises a central processing unit (CPU) 11, a non-volatile storage 13, and a memory 16 as a transitory storage region. In addition, the radiation image processing device 10 comprises a display 14, such as a liquid crystal display, an input device 15, such as a keyboard and a mouse, and a network interface (I/F) 17 connected to a network (not shown). The CPU 11, the storage 13, the display 14, the input device 15, the memory 16, and the network OF 17 are connected to a bus 18. Note that the CPU 11 is an example of a processor according to the present disclosure.

The storage 13 is realized by a hard disk drive (HDD), a solid state drive (SSD), a flash memory, and the like. A radiation image processing program 12 installed in the radiation image processing device 10 is stored in the storage 13 as a storage medium. The CPU 11 reads out the radiation image processing program 12 from the storage 13, expands the read out radiation image processing program 12 to the memory 16, and executes the expanded radiation image processing program 12.

Note that the radiation image processing program 12 is stored in a storage device of the server computer connected to the network or in a network storage in a state of being accessible from the outside, and is downloaded and installed in the computer that configures the radiation image processing device 10 in response to the request. Alternatively, the radiation image processing program 12 is distributed in a state of being recorded on a recording medium, such as a digital versatile disc (DVD) or a compact disc read only memory (CD-ROM), and is installed in the computer that configures the radiation image processing device 10 from the recording medium.

Figure 3:
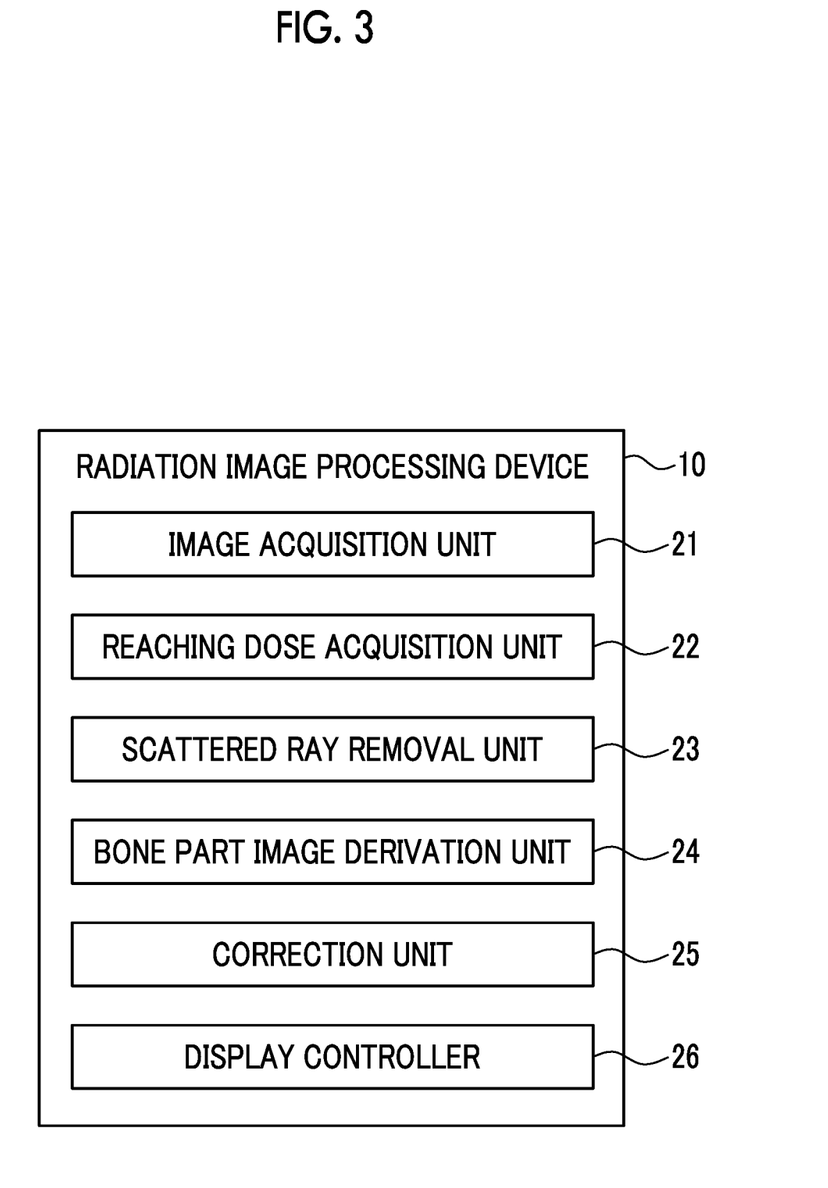
FIG. 3 is a diagram showing a functional configuration of the radiation image processing device according to the first embodiment.

Next, a functional configuration of the radiation image processing device according to the first embodiment will be described. FIG. 3 is a diagram showing a functional configuration of the radiation image processing device according to the first embodiment. As shown in FIG. 3, the radiation image processing device 10 comprises an image acquisition unit 21, a reaching dose acquisition unit 22, a scattered ray removal unit 23, a bone part image derivation unit 24, a correction unit 25, and a display controller 26. Moreover, by executing the radiation image processing program 12, the CPU 11 functions as the image acquisition unit 21, the reaching dose acquisition unit 22, the scattered ray removal unit 23, the bone part image derivation unit 24, the correction unit 25, and the display controller 26.

The image acquisition unit 21 acquires the first radiation image G1 and the second radiation image G2 of the subject H from the first and second radiation detectors 5 and 6 by causing the imaging apparatus 1 to perform the energy subtraction imaging of the subject H. The imaging conditions are set as described above in a case of the acquisition of the first radiation image G1 and the second radiation image G2.

The reaching dose acquisition unit 22 acquires the reaching dose I0, which is the dose of the radiation emitted from the radiation source 3 that is not transmitted through the subject H and directly reaches the radiation detector 5. In a case of acquiring the reaching dose I0, the reaching dose acquisition unit 22 first uses the first radiation image G1 acquired by the first radiation detector 5 on the side close to the radiation source 3 to detect a direct radiation region in the first radiation detector 5 directly irradiated with the radiation.

Figure 4:
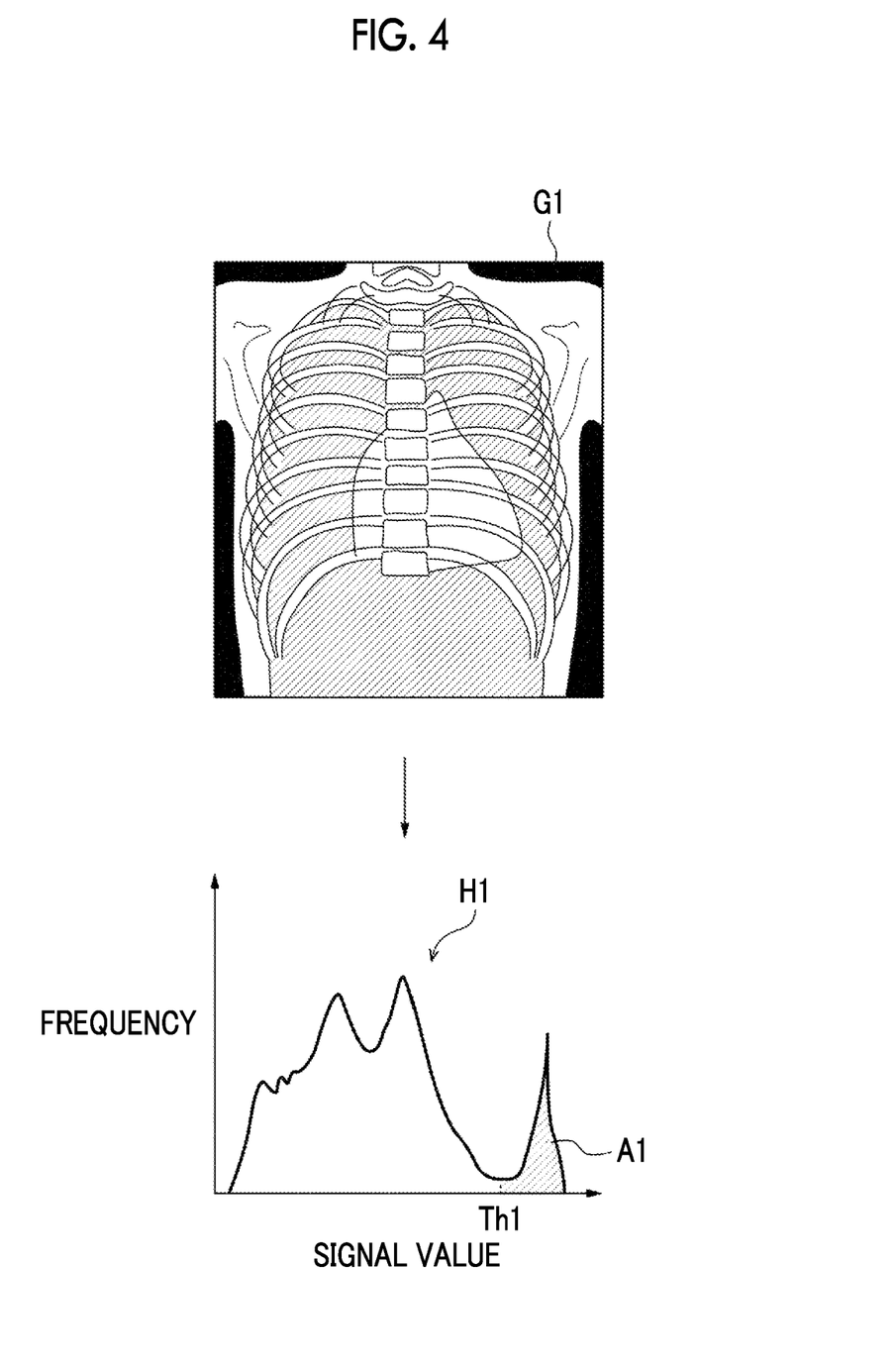
FIG. 4 is a diagram showing detection of a direct radiation region.

FIG. 4 is a diagram showing the detection of the direct radiation region. As shown in FIG. 4, the reaching dose acquisition unit 22 derives a histogram H1 of the first radiation image G1. A horizontal axis of the histogram H1 is the signal value, and a vertical axis is the frequency. The direct radiation region appears as a region of high concentration in the first radiation image G1. Therefore, the reaching dose acquisition unit 22 detects the region in the radiation detector 5 in which a signal value A1 equal to or larger than a predetermined threshold value Th1 is acquired in the histogram H1, as the direct radiation region.

Note that the direct radiation region in the first radiation image G1 may be detected by using an identifier that has been subjected to machine learning to detect the direct radiation region in the radiation image, instead of using the histogram H1. Such an identifier is constructed by performing machine learning on a neural network, such as a convolutional neural network, using the radiation image in which the direct radiation region is known as training data.

Here, in the first embodiment, some image sensors of the radiation detectors 5 and 6 are substituted with the dose sensors that detect the dose of the emitted radiation and output a signal indicating the dose.

Figure 5:
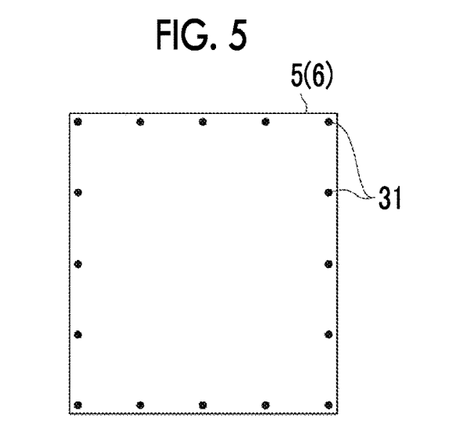
FIG. 5 is a diagram showing a radiation detector in which some image sensors are substituted with dose sensors.

FIG. 5 is a diagram showing the radiation detector in which some image sensors are substituted with the dose sensors. As shown in FIG. 5, in the radiation detectors 5 and 6, some image sensors in a region in the vicinity of an edge part of a detection surface, which is likely to be the direct radiation region, are substituted with the dose sensors 31. In the present embodiment, the output of the dose sensor 31 in the first radiation detector 5 is used as the reaching dose I0.

Note that, in the first radiation image G1, a pixel value of the pixel at a position of the dose sensor 31 cannot be obtained. Therefore, in the present embodiment, the pixel value of the pixel at the position of the dose sensor 31 is derived by an interpolation operation using the pixel values of the pixels around the pixel.

The scattered ray removal unit 23 removes the scattered ray component from each of the first radiation image G1 and the second radiation image G2 acquired by the image acquisition unit 21. The processing of removing the scattered ray component is an example of predetermined image processing of the present disclosure. In the following description, the removal of the scattered ray component will be described. As a method for removing the scattered ray component, for example, any method, such as a method disclosed in JP2015-043959A, can be used. In the following description, scattered ray removal processing with respect to the first radiation image G1 in a case in which the method disclosed in JP2015-043959A is used will be described. Note that, in the following description, G1 and G2 will be used as reference numerals for the first and second radiation images from which the scattered ray component is removed.

First, the scattered ray removal unit 23 acquires a virtual model of the subject H having an initial body thickness distribution Ts(x,y). The virtual model is data virtually representing the subject H of which a body thickness in accordance with the initial body thickness distribution Ts(x,y) is associated with a coordinate position of each pixel of the first radiation image G1. Note that the virtual model of the subject H having the initial body thickness distribution Ts(x,y) is stored in the storage 13 in advance, but the virtual model may be acquired from an external server in which the virtual model is stored. In the following description, the derivation of the initial body thickness distribution Ts(x,y) will be described.

First, in a case in which the initial body thickness distribution is defined as Ts, the attenuation coefficient of the subject H in a case of having the initial body thickness distribution Ts is defined as μ(Ts), and a scatter-to-primary ratio, which is a ratio between the scattered ray dose and a primary ray dose included in the radiation after being transmitted through the subject H having the initial body thickness distribution Ts in a case in which a scattered ray spread is not considered is defined as STPR(Ts), a dose I1 after being transmitted through the subject H is represented by Expression (1). The reaching dose I0 in Expression (1) is acquired by the reaching dose acquisition unit 22. Note that, in Expression (1), the initial body thickness distribution Ts, the reaching dose I0, and the dose I1 are derived for each pixel of the radiation image G0, but (x,y) is omitted. In addition, although STPR is a non-linear function that depends on the tube voltage (kV) as well as the body thickness, the kV notation is omitted in Expression (1).

$$I1=I0\times\exp\{-\mu(Ts)\times Ts\}\times\{1+STPR(Ts)\} \quad (1)$$

In Expression (1), the dose I1 is a pixel value in each pixel of the radiation image G1. On the other hand, since STPR is a non-linear function, Expression (1) cannot be solved algebraically with respect to Ts. Therefore, the scattered ray removal unit 23 defines an error function E1 shown in Expression (2) or Expression (2-1). Moreover, Ts at which the error function E1 is smallest or the error function E1 is smaller than a predetermined threshold value Th1 is derived as the initial body thickness distribution. In this case, the scattered ray removal unit 23 derives the initial body thickness distribution Ts by using an optimization algorithm, such as the steepest descent method and the conjugate gradient method.

$$E1=[I1-I0\times\exp\{-\mu(Ts)\times Ts\}\times\{1+STPR(Ts)\}]^2 \quad (2)$$

$$E1=|I1-I0\times\exp\{-\mu(Ts)\times Ts\}\times\{1+STPR(Ts)\}| \quad (2\text{-}1)$$

As shown in Expression (3) and Expression (4), the scattered ray removal unit 23 derives an estimated primary ray image Ip(x,y) in which a primary ray image obtained by imaging the virtual model is estimated and an estimated scattered ray image Is(x,y) in which a scattered ray image obtained by imaging the virtual model is estimated, based on the virtual model. Further, as shown in Expression (5), the scattered ray removal unit 23 derives an image obtained by combining the estimated primary ray image Ip(x,y) and the estimated scattered ray image Is(x,y) as an estimated image Im(x,y) in which the first radiation image G1 obtained by imaging the subject H is estimated.

$$Ip(x,y)=Io(x,y)\times\exp(-\mu\text{Soft}(T(x,y))\times T(x,y)) \quad (3)$$

$$Is(x,y)=Ip(x,y)\times STPR(T(x,y))*PSF(T(x,y)) \quad (4)$$

$$Im(x,y)=Is(x,y)+Ip(x,y) \quad (5)$$

Here, (x,y) is the coordinates of the pixel position of the first radiation image G1, Io(x,y) is the reaching dose acquired by the reaching dose acquisition unit 22, which is the dose at which the radiation is detected by the radiation detector 5 in a case in which it is assumed that the subject H is not present at the pixel position (x,y), Ip(x,y) is a primary ray component at the pixel position (x,y), and Is(x,y) is a scattered ray component at the pixel position (x,y). Note that, in a case of deriving the first estimated image Im(x,y), the initial body thickness distribution Ts(x,y) is used as the body thickness distribution T(x,y) in Expression (3) and Expression (4).

In addition, μSoft(T(x,y)) in Expression (3) is an attenuation coefficient in accordance with the body thickness distribution (x,y) of the soft tissue of the human body at the pixel position (x,y). The μSoft(T(x,y)) need only be obtained in advance experimentally or by simulation and stored in the storage 13. Note that, in the present embodiment, as the attenuation coefficient μSoft(T(x,y)), an attenuation coefficient of a standard soft part described below is used.

In addition, the PSF(T(x,y)) in Expression (4) is a point spread function representing the distribution of the scattered rays spreading from one pixel in accordance with the body thickness distribution T(x,y), and is defined in accordance with the energy characteristic of the radiation. In addition, * is an operator representing a convolution operation. The PSF is also changed due to a distribution of irradiation fields in the imaging apparatus 1, a distribution of the compositions of the subject H, the irradiation dose during imaging, the tube voltage, an imaging distance, the characteristics of the radiation detectors 5 and 6, and the like. Therefore, the PSF need only be experimentally obtained in advance for each energy characteristic of the radiation used by the imaging apparatus 1 in accordance with irradiation field information, subject information, the imaging condition, and the like, and stored in the storage 13.

Next, the scattered ray removal unit 23 corrects the initial body thickness distribution Ts(x,y) of the virtual model such that a difference between the estimated image Im and the first radiation image G1 is small. The scattered ray removal unit 23 updates the body thickness distribution T(x,y), the scattered ray component Is(x,y), and the primary ray component Ip(x,y) by repeating the derivation of the body thickness distribution T(x,y), the scattered ray component Is(x,y), and the primary ray component Ip(x,y) until a difference between the estimated image Im and the first radiation image G1 satisfies a predetermined termination condition. The scattered ray removal unit 23 subtracts the scattered ray component Is(x,y) derived by Expression (5) from the first radiation image G1 in a case in which the termination condition is satisfied. As a result, the scattered ray component included in the first radiation image G1 is removed. Note that the body thickness distribution T(x,y) derived in a case in which the termination condition is satisfied is used for a bone density described below is derived.

On the other hand, the scattered ray removal unit 23 also performs the scattered ray removal processing on the second radiation image G2 in the same manner as in the first radiation image G1. Note that, in the following description, G1 and G2 will be used as reference numerals for the first and second radiation images from which the scattered ray components are removed.

Figure 6:
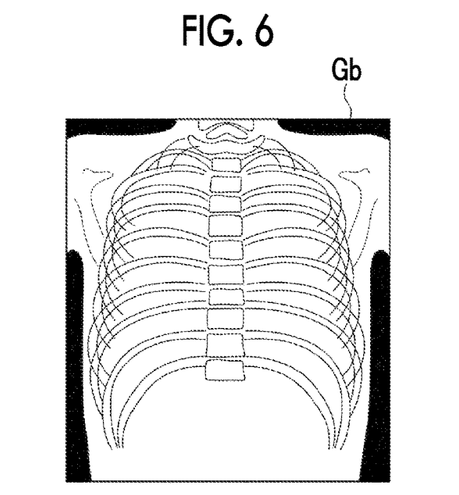
FIG. 6 is a diagram showing a bone part image.

The bone part image derivation unit 24 generates a bone part image Gb representing the bone region of the subject H from the first and the second radiation images G1 and G2 from which the scattered ray components are removed by the scattered ray removal unit 23. Note that the bone part is an example of a specific tissue of the present disclosure. FIG. 6 is a diagram showing an example of the bone part image Gb generated by the bone part image derivation unit 24.

The bone part image derivation unit 24 generates the bone part image Gb in which only the bone part of the subject H included in the first radiation image G1 and the second radiation image G2 is extracted by performing weighting subtraction between the corresponding pixels, on the first radiation image G1 and the second radiation image G2, as shown in Expression (6). Note that al in Expression (6) is a weighting coefficient and is derived based on an attenuation coefficient corresponding to the radiation energy of the soft part and the bone part of the subject H. In addition, x and y are the coordinates of each pixel of the bone part image Gb.

$$Gb(x,y)=G1(x,y)-\alpha 1 \times G2(x,y) \qquad (6)$$

The correction unit 25 derives a bone density image representing the bone density in the bone region of the subject H by correcting the bone part image Gb generated by the bone part image derivation unit 24. The processing of correcting the bone part image Gb is an example of predetermined image processing of the present disclosure. The correction unit 25 derives a bone density image B by deriving the bone density B(x,y) for each pixel (x,y) of the bone part image Gb. Note that the bone density B(x,y) may be derived for all the bones included in the bone part image Gb or the bone density B(x,y) may be derived only for a predetermined bone.

Specifically, the correction unit 25 derives the bone density B(x,y) corresponding to each pixel of the bone part image Gb by regarding, as the bone density, a value obtained by converting each pixel value Gb(x,y) of the bone region of the bone part image Gb into the pixel value of the bone part image in a case of being acquired under a standard imaging condition. More specifically, the correction unit 25 derives the bone density B(x,y) for each pixel by correcting each pixel value Gb(x,y) of the bone part image Gb by using the correction coefficient acquired from a look-up table described below.

Here, a contrast (that is, a difference between the pixel values) between a soft part and a bone part in the radiation image is lower as the tube voltage in the radiation source 3 is higher and the energy of the radiation emitted from the radiation source 3 is higher. In addition, in a procedure of the radiation transmitted through the subject H, a low-energy component of the radiation is absorbed by the subject H, and beam hardening occurs in which the radiation energy is increased. The increase in the radiation energy due to the beam hardening is larger as the body thickness of the subject H is larger.

Figure 7:
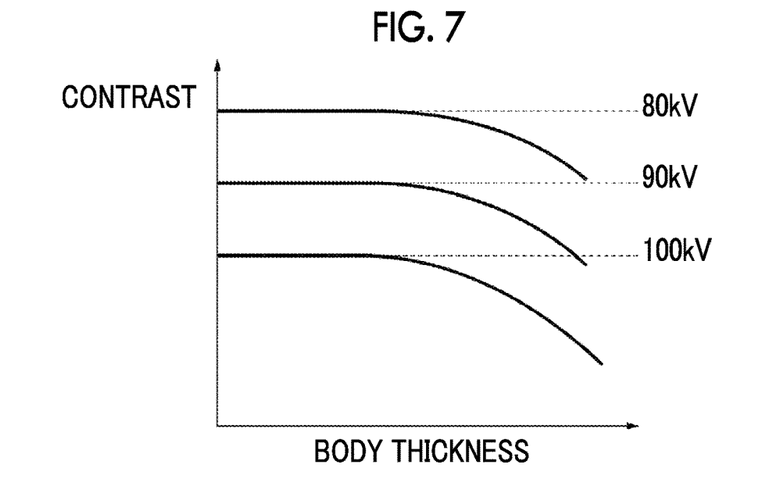
FIG. 7 is a diagram showing a relationship of contrasts of a bone part and a soft part with respect to a body thickness.

FIG. 7 is a diagram showing a relationship of the contrast between the bone part and the soft part with respect to the body thickness of the subject H. Note that FIG. 7 shows the relationship of the contrast between the bone part and the soft part with respect to the body thickness of the subject H at the three tube voltages of 80 kV, 90 kV, and 100 kV. As shown in FIG. 7, the contrast is lower as the tube voltage is higher. In addition, in a case in which the body thickness of the subject H exceeds a certain value, the contrast is lower as the body thickness is larger. Note that contrast between the bone part and the soft part is higher as the pixel value Gb(x,y) of the bone region in the bone part image Gb is larger. Therefore, the relationship shown in FIG. 7 shifts to a higher contrast side as the pixel value Gb(x,y) of the bone region in the bone part image Gb is increased.

In the present embodiment, the look-up table for acquiring the correction coefficient for correcting the difference in the contrast depending on the tube voltage during imaging and the decrease in the contrast due to the influence of the beam hardening in the bone part image Gb is stored in the storage 13. The correction coefficient is the coefficient for correcting each pixel value Gb(x,y) of the bone part image Gb.

Figure 8:
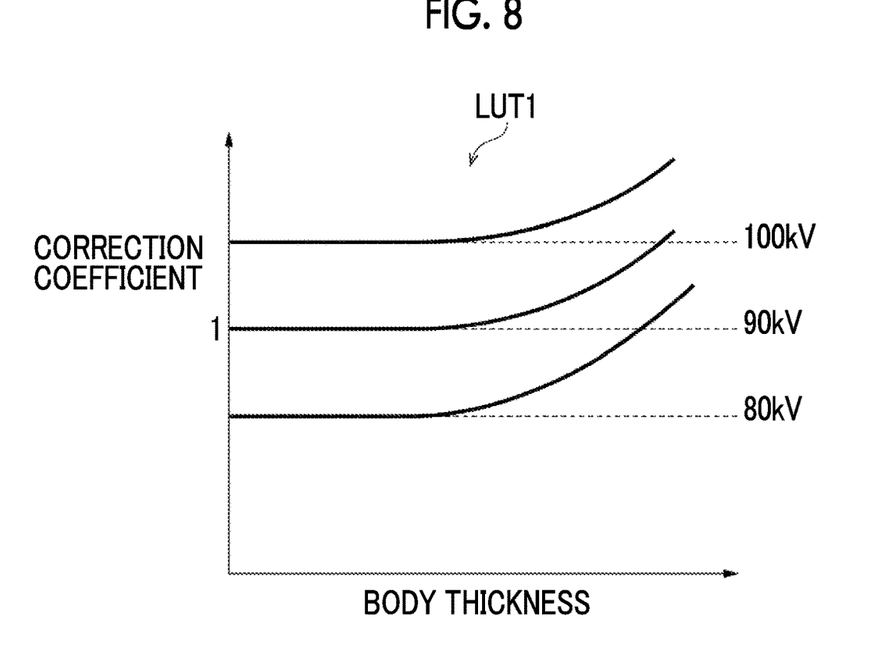
FIG. 8 is a diagram showing an example of a look-up table for acquiring a correction coefficient.

FIG. 8 is a diagram showing an example of the look-up table stored in the storage 13. In FIG. 8, a look-up table LUT1 in which the standard imaging condition is set to the tube voltage of 90 kV is shown. As shown in FIG. 8, in the look-up table LUT1, the correction coefficient is set to be larger as the tube voltage is higher and the body thickness of the subject is larger. In the example shown in FIG. 8, since the standard imaging condition is the tube voltage of 90 kV, the correction coefficient is 1 in a case in which the tube voltage is 90 kV and the body thickness is 0. Note that although the look-up table LUT1 is shown in two dimensions in FIG. 8, the correction coefficient differs depending on the pixel value of the bone region. Therefore, the look-up table LUT1 is actually a three-dimensional table to which an axis representing the pixel value of the bone region is added.

Here, the correction coefficient is derived by capturing the radiation image using a phantom that simulates the human body, including a substance corresponding to the soft tissue and a substance corresponding to the bone tissue of the human body. For example, acrylic or urethane can be applied as the substance corresponding to the soft tissue. In addition, for example, hydroxyapatite and the like can be applied as the substance corresponding to the bone tissue of the human body. Note that, for the substance corresponding to the soft tissue in the phantom, the attenuation coefficient of the radiation and the fat percentage are predetermined values corresponding to the substance. Here, as described above, the contrast between the bone part and the soft part is smaller as the body thickness of the subject is larger. As a result, in a case in which the body thickness is the same, the bone density derived from the radiation image is decreased as the body thickness is increased, even in a case in which the bone density is the same.

Therefore, the pixel values of the bone region in accordance with the body thickness are derived from the radiation image acquired by imaging the phantom having various thicknesses, and the correction coefficient in accordance with the body thickness is derived such that the derived pixel values have the same bone density. In addition, the correction coefficient is derived in accordance with various tube voltages. As a result, the look-up table LUT1 shown in FIG. 8 can be derived.

The correction unit 25 acquires the body thickness distribution T(x,y) of the subject H and a correction coefficient C0(x,y) for each pixel depending on the imaging condition including a set value of the tube voltage stored in the storage 13 from the look-up table LUT1. Note that the tube voltage fluctuates from the set value due to the degradation of the radiation source 3. Therefore, in the present embodiment, the actual tube voltage output by the tube voltage sensor 9 is used as the tube voltage used in a case of acquiring the correction coefficient C0(x,y). Moreover, as shown in Expression (7), the correction unit 25 multiplies each pixel value Gb(x,y) of the bone region in the bone part image Gb by the correction coefficient C0(x,y) to derive a bone density B(x,y) for each pixel of the bone part image Gb. As a result, the bone density image B having the bone density B(x,y) as the pixel value is derived. The bone density B(x,y) derived in this way is acquired by imaging the subject H by the tube voltage of 90 kV, which is the standard imaging condition, and represents the pixel value of the bone part in the bone region included in the radiation image from which the influence of the beam hardening is removed. Note that, in the present embodiment, a unit of bone density is g/cm$^2$. The bone density image B is an example of a subtraction image of the present disclosure.

$$B(x,y)=C0(x,y) \times Gb(x,y) \qquad (7)$$

Figure 9:
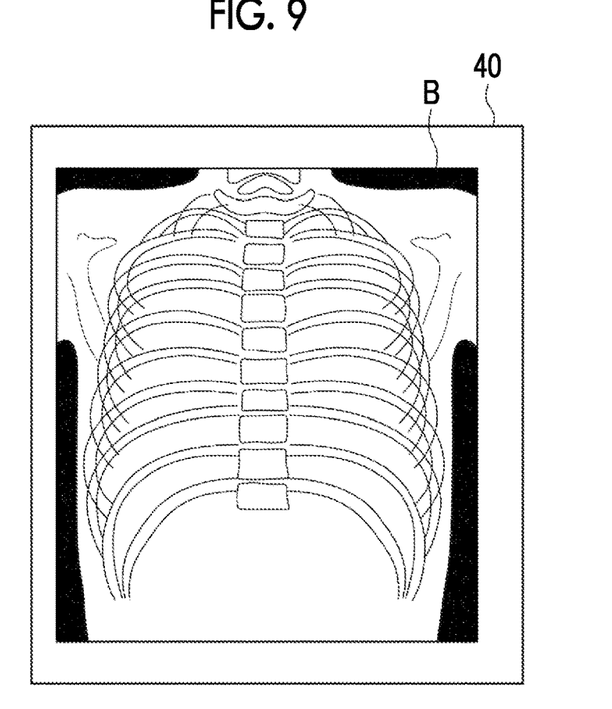
FIG. 9 is a diagram showing a display screen.

The display controller 26 displays the bone density image B on the display 14. FIG. 9 is a diagram showing a display screen of the bone density image B. As shown in FIG. 9, the bone density image B is displayed on a display screen 40.

Figure 10:
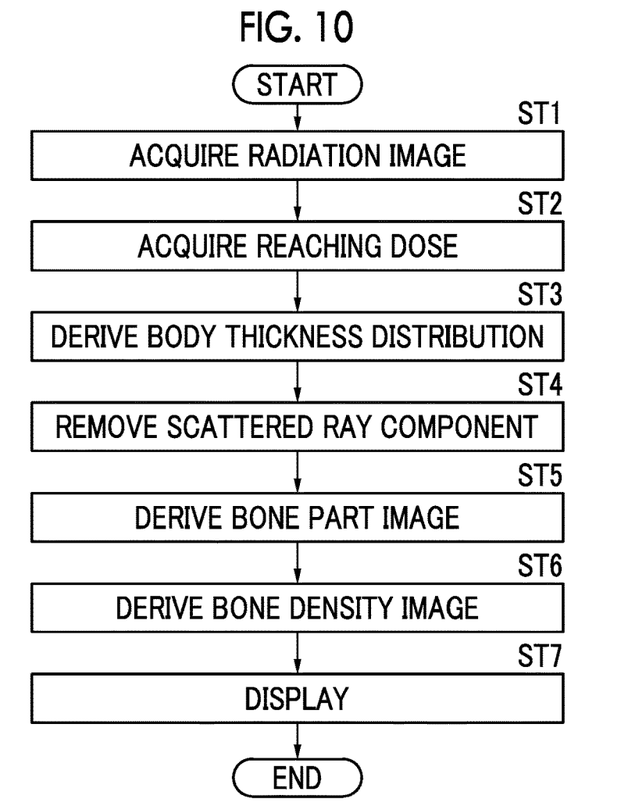
FIG. 10 is a flowchart showing processing performed in the first embodiment.

Hereinafter, processing performed in the first embodiment will be described. FIG. 10 is a flowchart showing the processing performed in the first embodiment. The image acquisition unit 21 causes the imaging apparatus 1 to perform the energy subtraction imaging of the subject H to acquire the first and second radiation images G1 and G2 (radiation image acquisition; step ST1). Then, the reaching dose acquisition unit 22 acquires the reaching dose I0 (step ST2). The scattered ray removal unit 23 derives the body thickness distribution T(x,y) of the subject H by using the reaching dose I0 acquired by the reaching dose acquisition unit 22 (step ST3), and the scattered ray component is removed from the first and second radiation images G1 and G2 (step ST4). Note that pieces of processing of steps ST3 and ST4 are performed in parallel. Then, the bone part image derivation unit 24 derives the bone part image Gb in which the bone part of the subject H is extracted from the first and second radiation images G1 and G2 from which the scattered ray components are removed (step ST5).

Next, the correction unit 25 corrects the bone part image Gb to derive the bone density image B (step ST6), the display controller 26 displays the bone density image B (step ST7), and the processing ends.

Here, in a case in which the radiation source 3 is driven to irradiate the radiation detector 5 with the radiation in a state in which the subject H is not present, the reaching dose I0 to the radiation detector 5 can be derived by Expression (8) using the imaging conditions set in the imaging apparatus 1. In Expression (8), mAs included in the imaging conditions is a dose, and kV is a tube voltage. Here, F is a linear or non-linear function that represents the radiation dose that reaches to the radiation detector 5 in a case in which the dose (for example, 1 mAs), which is a standard, is emitted to the radiation detector 5 at the SID (for example, 100 cm), which is a standard, in a state in which the subject H is not present. F is changed depending on the tube voltage. Also, since the reaching dose I0 is derived for each pixel of the radiation image G0 acquired by the radiation detector 5, (x,y) represents the pixel position of each pixel.

$$I0(x,y)=mAs \times F(kV)/SID^2 \qquad (8)$$

On the other hand, the sensitivities of the tube of radiation and the radiation detectors 5 and 6 used in the radiation source 3 of the imaging apparatus 1 are degraded with time. In a case in which the tube is degraded, the imaging conditions set in the imaging apparatus 1 deviate from the set values. Here, the reaching dose I0 can be derived from the tube voltage and the dose by using Expression (8). However, in a case in which the imaging conditions deviate from the set values, since the tube voltage and the dose deviate from the set values, the reaching dose I0 derived by using Expression (8) deviates from the actual reaching dose, and as a result, the initial body thickness distribution Ts derived by using Expressions (2) and (2-1) also deviates. Therefore, it is not possible to derive the body thickness distribution of the subject H with high accuracy. In addition, in a case in which the sensitivities of the radiation detectors 5 and 6 are degraded, the accuracy of the signal values output from the radiation detectors 5 and 6 is lowered. In a case in which the accuracy of the body thickness distribution and the accuracy of the signal value are lowered, the accuracy of the scattered ray component derived in Expression (4) is lowered, and as a result, the scattered ray component cannot be removed from the radiation images G1 and G2 with high accuracy.

In addition, in a case in which the tube voltage deviates from the set value and the accuracy of the body thickness distribution is further lowered, the accuracy of the correction coefficient C0(x,y) in Expression (7) is also lowered, so that the bone part image Gb cannot be corrected with high accuracy.

In the present embodiment, the reaching dose acquisition unit 22 acquires the reaching dose I0, which is the dose of the radiation emitted from the radiation source 3 that is not transmitted through the subject H and directly reaches the first radiation detector 5. Therefore, even in a case in which the sensitivities of the tube of the radiation and the first and second radiation detectors 5 and 6 deteriorate with time, since the actually measured reaching dose I0 is used, the initial body thickness distribution Ts and further the body thickness distribution of the subject can be obtained with high accuracy. Therefore, since the scattered ray component can be derived with high accuracy by Expression (4), the scattered ray component can be removed from the radiation images G1 and G2 with high accuracy. Therefore, it is possible to make the image quality of the bone part image Gb derived by the energy subtraction processing, and further the bone density image B stable.

In addition, in the present embodiment, since the actual tube voltage is measured by the tube voltage sensor 9, the correction coefficient C0 in Expression (7) can also be derived with high accuracy, and as a result, the bone density image B can be derived with high accuracy. Therefore, according to the present embodiment, it is possible to make the image quality of the bone density image B derived by the energy subtraction processing stable.

Figure 11:
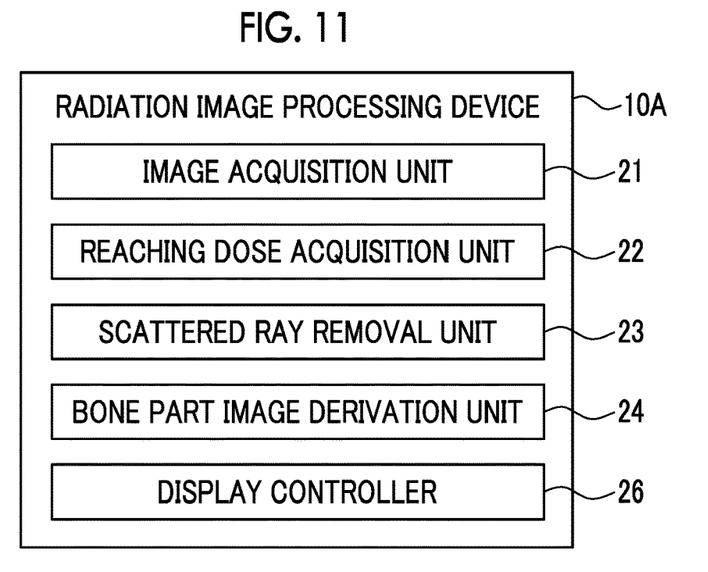
FIG. 11 is a diagram showing a functional configuration of a radiation image processing device according to a second embodiment.

Hereinafter, a second embodiment of the present disclosure will be described. FIG. 11 is a diagram showing a functional configuration of a radiation image processing device according to the second embodiment. Note that, in FIG. 11, the same reference numerals are assigned to the same configurations as those in FIG. 3, and detailed description thereof will be omitted. The second embodiment is different from the first embodiment in that only the scattered ray removal processing is performed and the processing of correcting the bone part image Gb is not performed. Therefore, a radiation image processing device 10A according to the second embodiment does not comprise the correction unit 25. In the second embodiment, the bone part image Gb is an example of a subtraction image of the present disclosure.

Figure 12:
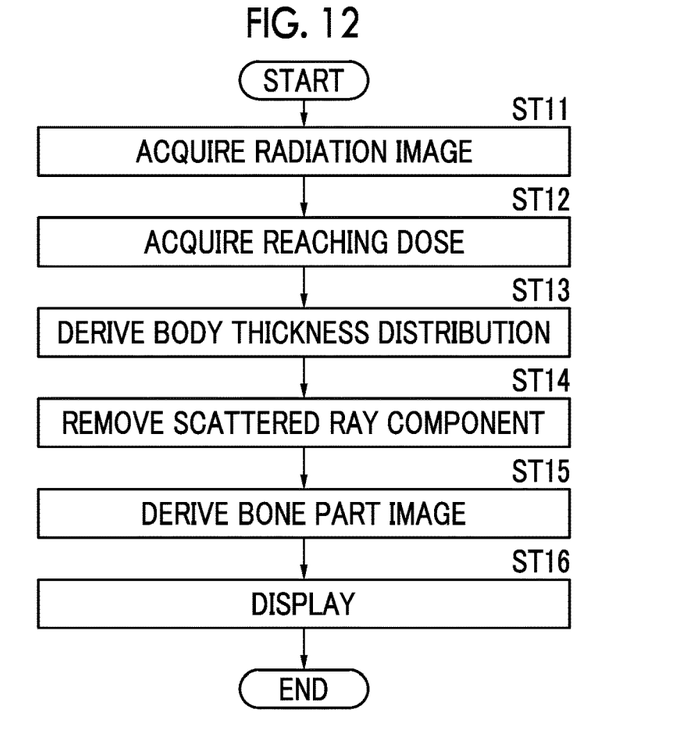
FIG. 12 is a flowchart showing processing performed in the second embodiment.

Hereinafter, processing performed in the second embodiment will be described. FIG. 12 is a flowchart showing the processing performed in the second embodiment. The image acquisition unit 21 causes the imaging apparatus 1 to perform the energy subtraction imaging of the subject H to acquire the first and second radiation images G1 and G2 (radiation image acquisition; step ST11). Then, the reaching dose acquisition unit 22 acquires the reaching dose I0 (step ST12). The scattered ray removal unit 23 derives the body thickness distribution T(x,y) of the subject H by using the reaching dose I0 acquired by the reaching dose acquisition unit 22 (step ST13), and the scattered ray component is removed from the first and second radiation images G1 and G2 (step ST14). Note that pieces of processing of steps ST13 and ST14 are performed in parallel. Then, the bone part image derivation unit 24 derives the bone part image Gb in which the bone part of the subject H is extracted from the first and second radiation images G1 and G2 from which the scattered ray components are removed (step ST15). Next, the display controller 26 displays the bone density image B (step ST16), and ends the processing.

Figure 13:
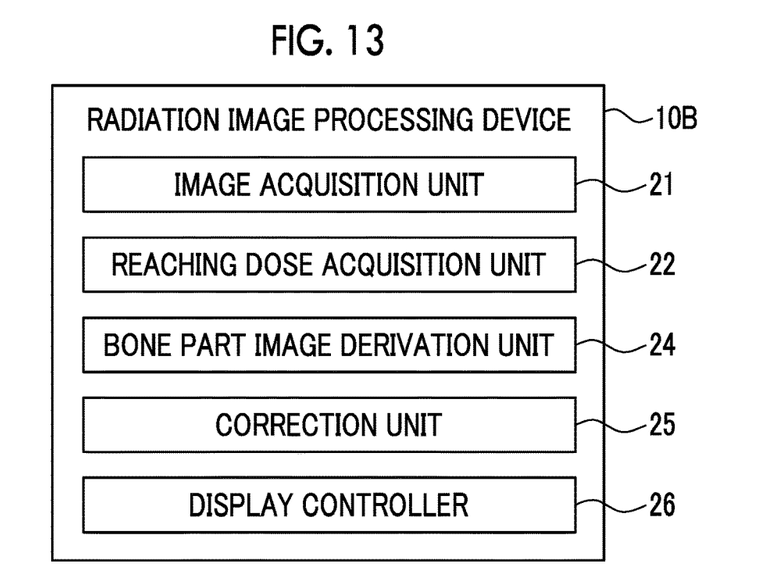
FIG. 13 is a diagram showing a functional configuration of a radiation image processing device according to a third embodiment.

Hereinafter, a third embodiment of the present disclosure will be described. FIG. 13 is a diagram showing a functional configuration of a radiation image processing device according to the third embodiment. Note that, in FIG. 13, the same reference numerals are assigned to the same configurations as those in FIG. 3, and detailed description thereof will be omitted. The third embodiment is different from the first embodiment in that the scattered ray removal processing is not performed and only the processing of correcting the bone part image Gb is performed. Therefore, a radiation image processing device 10B according to the third embodiment does not comprise the scattered ray removal unit 23. On the other hand, the body thickness distribution of the subject H is necessary in order to derive the correction coefficient as described above. In the third embodiment, the correction unit 25 derives the body thickness distribution of the subject H. Alternatively, a body thickness derivation unit that derives the body thickness distribution of the subject H may be separately provided. In addition, in the third embodiment, the scattered ray removal unit 23 may be provided, and the body thickness distribution may be derived from the scattered ray removal unit 23. In the third embodiment, the bone density image B corresponds to a subtraction image of the present disclosure.

Figure 14:
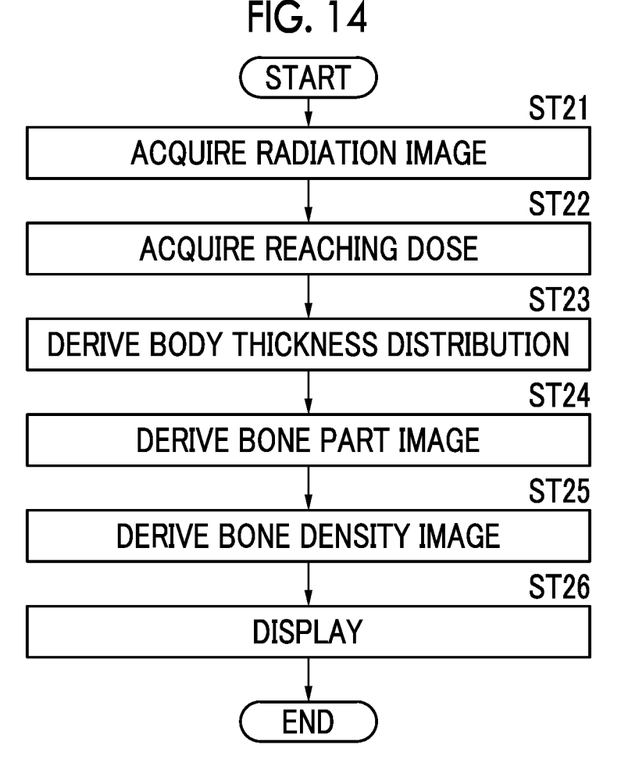
FIG. 14 is a flowchart showing processing performed in the third embodiment.

Hereinafter, processing performed in the third embodiment will be described. FIG. 14 is a flowchart showing the processing performed in the third embodiment. The image acquisition unit 21 causes the imaging apparatus 1 to perform the energy subtraction imaging of the subject H to acquire the first and second radiation images G1 and G2 (radiation image acquisition; step ST21). Then, the reaching dose acquisition unit 22 acquires the reaching dose I0 (step ST22). Then, the correction unit 25 derives the body thickness distribution T(x,y) of the subject H by using the reaching dose I0 acquired by the reaching dose acquisition unit 22 (step ST23). Moreover, the bone part image derivation unit 24 derives the bone part image Gb in which the bone part of the subject H is extracted from the first and second radiation images G1 and G2 (step ST24). Next, the correction unit 25 corrects the bone part image Gb to derive the bone density image B (step ST25), the display controller 26 displays the bone density image B (step ST26), and the processing ends.

Figure 15:
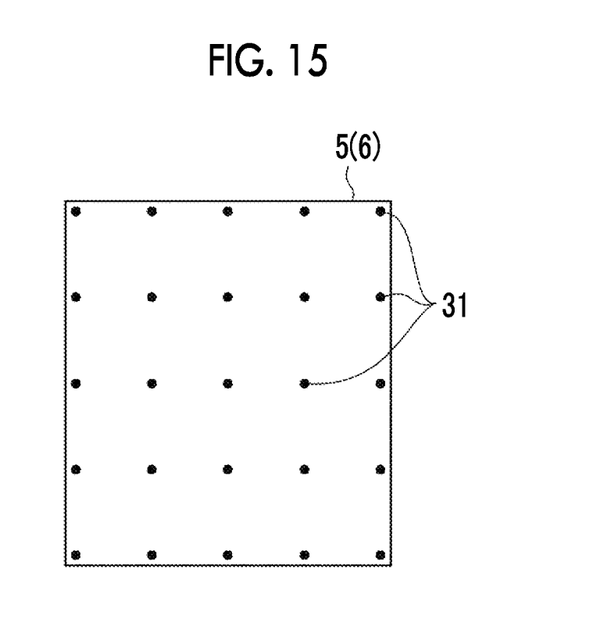
FIG. 15 is a diagram showing another example of the radiation detector in which some image sensors are substituted with the dose sensors.

Note that, in each of the embodiments described above, the radiation detectors 5 and 6 in which some image sensors in the region in the vicinity of the edge part of the detection surface are substituted with the dose sensors 31 are used, but the present disclosure is not limited to this. As shown in FIG. 15, some image sensors may be substituted with the dose sensors 31 at equal intervals on the entire surface of the radiation detectors 5 and 6.

Figure 16:
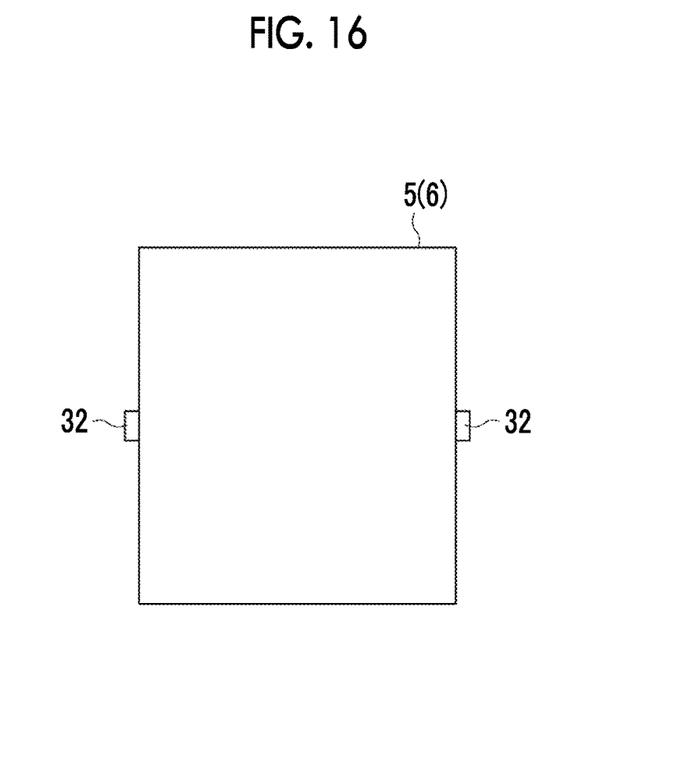
FIG. 16 is a diagram showing the radiation detector in which the dose sensor is installed outside a region in which the image sensor is installed.

In addition, in each of the embodiments described above, some image sensors of the radiation detectors 5 and 6 are substituted with the dose sensors 31, and the dose sensor 31 is used to acquire the reaching dose I0, but the present disclosure is not limited to this. As shown in FIG. 16, a dose sensor 32 may be installed outside a region in the radiation detectors 5 and 6 in which the image sensor is installed, and the installed dose sensor 32 may be used to acquire the reaching dose I0.

Figure 17:
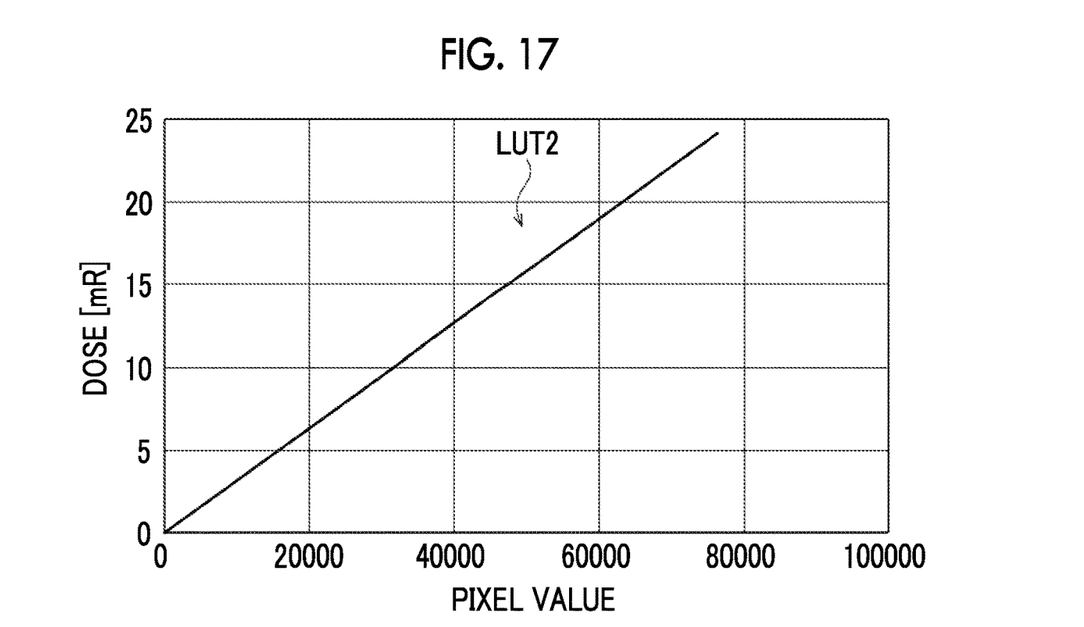
FIG. 17 is a diagram showing a relationship between a pixel value and a dose.

Further, in each of the embodiments described above, the reaching dose I0 is acquired by using the dose sensors 31 and 32, but the present disclosure is not limited to this. The signal value of the direct radiation region in the radiation detector 5 may be acquired as the reaching dose I0. In this case, the reaching dose acquisition unit 22 acquires the reaching dose I0 by converting the signal value output by the image sensor in the direct radiation region in the radiation detector 5, that is, the pixel value in the direct radiation region in the first radiation image G1. FIG. 17 is a diagram showing a relationship between the pixel value and the dose. In the present embodiment, a look-up table LUT2 showing the relationship shown in FIG. 17 is stored in the storage 13. The reaching dose acquisition unit 22 acquires the reaching dose I0 by converting the pixel value of the direct radiation region with reference to the look-up table LUT2. Even in a case in which the reaching dose I0 acquired in this way is used, the image quality of the image derived by the energy subtraction processing can be made stable as in each of the embodiments described above.

In addition, in each of the embodiments described above, the bone density image B or the bone part image Gb is displayed on the display screen 30, but the present disclosure is not limited to this. A soft part image Gs of the subject H may be derived by Expression (9), and the soft part image Gs and the bone part image Gb may be displayed in a switchable manner. Further, the radiation images G1 and G2 may be displayed in a switchable manner, in addition to the soft part image Gs and the bone part image Gb. In this case, the displayed radiation images G1 and G2 may be the radiation images G1 and G2 from which scattered rays are removed or the radiation images G1 and G2 from which scattered rays are not removed.

$$Gs(x,y)=G1(x,y)-\alpha 2 \times G2(x,y) \qquad (9)$$

In addition, in each of the embodiments described above, the bone density image B for the chest of the subject H is derived, but the present disclosure is not limited to this. For example, the bone density image B of any bone part of the subject H, such as the femur, the vertebral bone, the heel bone, and the metatarsophalangeal bone, may be derived.

In addition, in each of the embodiments described above, the first and second radiation images G1 and G2 are acquired by the one-shot method in a case in which the energy subtraction processing is performed for deriving the bone density, but the present disclosure is not limited to this. The first and second radiation images G1 and G2 may be acquired by a so-called two-shot method in which imaging is performed twice by using only one radiation detector. In a case of the two-shot method, a position of the subject H included in the first radiation image G1 and the second radiation image G2 may shift due to a body movement of the subject H. Therefore, in the first radiation image G1 and the second radiation image G2, it is preferable to perform the processing according to the present embodiment after registration of the subject is performed.

In addition, in the embodiments described above, the bone density is derived by using the radiation image acquired in the system that images the subject H using the first and second radiation detectors 5 and 6, but it is needless to say that the technology of the present disclosure can be applied even in a case in which the first and second radiation images G1 and G2 are acquired using an accumulative phosphor sheet instead of the radiation detector. In this case, the first and second radiation images G1 and G2 need only be acquired by stacking two accumulative phosphor sheets, emitting the radiation transmitted through the subject H, accumulating and recording radiation image information of the subject H in each of the accumulative phosphor sheets, and photoelectrically reading the radiation image information from each of the accumulative phosphor sheets. Note that the two-shot method may also be used in a case in which the first and second radiation images G1 and G2 are acquired by using the accumulative phosphor sheet.

In addition, the radiation in the embodiments described above is not particularly limited, and α-rays or γ-rays can be used in addition to X-rays.

In addition, in the embodiments described above, various processors shown below can be used as the hardware structures of processing units that execute various pieces of processing, such as the image acquisition unit 21, the scattered ray removal unit 23, the bone part image derivation unit 24, the correction unit 25, and the display controller 26. As described above, the various processors include, in addition to the CPU that is a general-purpose processor which executes software (program) and functions as various processing units, a programmable logic device (PLD) that is a processor whose circuit configuration can be changed after manufacture, such as a field programmable gate array (FPGA), and a dedicated electrical circuit that is a processor having a circuit configuration which is designed for exclusive use in order to execute a specific processing, such as an application specific integrated circuit (ASIC).

One processing unit may be configured by one of these various processors, or may be configured by a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer of a client, a server, and the like there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

Hereinafter, the supplementary notes of the present disclosure are described.

Supplementary Note 1

A radiation image processing device that derives a subtraction image in which a specific tissue in a subject is extracted, the subtraction image being derived by performing weighting subtraction on a plurality of radiation images acquired by imaging the subject with radiation having different energy distributions and being subjected to predetermined image processing, the radiation image processing device comprising at least one processor, in which the processor acquires a reaching dose which is a radiation dose that directly reaches a radiation detector that acquires the radiation image, and derives the subtraction image by performing the image processing based on the reaching dose.

Supplementary Note 2

The radiation image processing device according to Supplementary Note 1, in which the processor acquires the plurality of radiation images, derives a body thickness distribution of the subject based on the reaching dose, any of the plurality of radiation images, and an imaging condition in a case in which the plurality of radiation images are acquired, removes a scattered ray component of radiation scattered by the subject from the plurality of radiation images based on the body thickness distribution and the imaging condition, derives a bone part image in which a bone part of the subject is extracted, by performing the weighting subtraction on the plurality of radiation images from which the scattered ray component is removed, derives a correction coefficient for correcting a pixel value of the bone part image based on the body thickness distribution and the imaging condition, and derives the subtraction image by correcting the bone part image with the correction coefficient.

Supplementary Note 3

The radiation image processing device according to Supplementary Note 1, in which the processor acquires the plurality of radiation images, derives a body thickness distribution of the subject based on the reaching dose, any of the plurality of radiation images, and an imaging condition in a case in which the plurality of radiation images are acquired, removes a scattered ray component of radiation scattered by the subject from the plurality of radiation images based on the body thickness distribution and the imaging condition, and derives the subtraction image by performing the weighting subtraction on the plurality of radiation images from which the scattered ray component is removed.

Supplementary Note 4

The radiation image processing device according to Supplementary Note 1, in which the processor acquires the plurality of radiation images, derives a body thickness distribution of the subject based on the reaching dose, any of the plurality of radiation images, and an imaging condition in a case in which the plurality of radiation images are acquired, derives a bone part image in which a bone part of the subject is extracted, by performing the weighting subtraction on the plurality of radiation images, derives a correction coefficient for correcting a pixel value of the bone part image based on the body thickness distribution and the imaging condition, and derives the subtraction image by correcting the bone part image with the correction coefficient.

Supplementary Note 5

The radiation image processing device according to any one of Supplementary Notes 2 to 4, in which the processor acquires a tube voltage output by a tube voltage sensor that measures a tube voltage applied to a radiation source that emits the radiation, as one of the imaging conditions.

Supplementary Note 6

The radiation image processing device according to any one of Supplementary Notes 1 to 5, in which the processor acquires a signal value output by an image sensor in a direct radiation region in the radiation detector in which the radiation directly reaches, as the reaching dose.

Supplementary Note 7

The radiation image processing device according to any one of Supplementary Notes 1 to 5, in which the processor acquires a signal value output by a dose sensor installed in a direct radiation region in the radiation detector in which the radiation directly reaches, as the reaching dose.

Supplementary Note 8

The radiation image processing device according to any one of Supplementary Notes 1 to 5, in which the processor acquires a signal value output by a dose sensor installed outside a region in the radiation detector in which the radiation is detected, as the reaching dose.

Supplementary Note 9

A radiation image processing method of deriving a subtraction image in which a specific tissue in a subject is extracted, the subtraction image being derived by performing weighting subtraction on a plurality of radiation images acquired by imaging the subject with radiation having different energy distributions and being subjected to predetermined image processing, the radiation image processing method comprising acquiring a reaching dose which is a radiation dose that directly reaches a radiation detector that acquires the radiation image, and deriving the subtraction image by performing the image processing based on the reaching dose.

Supplementary Note 10

A radiation image processing program causing a computer to execute a procedure of deriving a subtraction image in which a specific tissue in a subject is extracted, the subtraction image being derived by performing weighting subtraction on a plurality of radiation images acquired by imaging the subject with radiation having different energy distributions and being subjected to predetermined image processing, the radiation image processing program causing the computer to execute a procedure of acquiring a reaching dose which is a radiation dose that directly reaches a radiation detector that acquires the radiation image, and a procedure of deriving the subtraction image by performing the image processing based on the reaching dose.

What is claimed is:

1. A radiation image processing device comprising:
at least one processor,
wherein the processor
acquires a reaching dose which is a radiation dose that directly reaches a radiation detector that acquires a plurality of radiation images acquired by imaging a subject with radiation having different energy distributions, and
derives a subtraction image in which a specific tissue in the subject is extracted by performing predetermined image processing based on the reaching dose, the subtraction image being derived by performing weighting subtraction on the plurality of radiation images,
wherein the processor acquires a signal value output by an image sensor in a direct radiation region in the radiation detector in which the radiation directly reaches, as the reaching dose, and
wherein the processor acquires a signal value output by a dose sensor installed outside a region in the radiation detector in which the radiation is detected, as the reaching dose.

2. The radiation image processing device according to claim 1,
wherein the processor
acquires the plurality of radiation images,
derives a body thickness distribution of the subject based on the reaching dose, any of the plurality of radiation images, and an imaging condition in a case in which the plurality of radiation images are acquired,
removes a scattered ray component of radiation scattered by the subject from the plurality of radiation images based on the body thickness distribution and the imaging condition,
derives a bone part image in which a bone part of the subject is extracted, by performing the weighting subtraction on the plurality of radiation images from which the scattered ray component is removed,
derives a correction coefficient for correcting a pixel value of the bone part image based on the body thickness distribution and the imaging condition, and derives the subtraction image by correcting the bone part image with the correction coefficient.

3. The radiation image processing device according to claim 1,
wherein the processor
acquires the plurality of radiation images,
derives a body thickness distribution of the subject based on the reaching dose, any of the plurality of radiation images, and an imaging condition in a case in which the plurality of radiation images are acquired,
removes a scattered ray component of radiation scattered by the subject from the plurality of radiation images based on the body thickness distribution and the imaging condition, and
derives the subtraction image by performing the weighting subtraction on the plurality of radiation images from which the scattered ray component is removed.

4. The radiation image processing device according to claim 1,
wherein the processor
acquires the plurality of radiation images,
derives a body thickness distribution of the subject based on the reaching dose, any of the plurality of radiation images, and an imaging condition in a case in which the plurality of radiation images are acquired,
derives a bone part image in which a bone part of the subject is extracted, by performing the weighting subtraction on the plurality of radiation images,
derives a correction coefficient for correcting a pixel value of the bone part image based on the body thickness distribution and the imaging condition, and
derives the subtraction image by correcting the bone part image with the correction coefficient.

5. The radiation image processing device according to claim 2,
wherein the processor acquires a measured tube voltage output by a tube voltage sensor that measures a tube voltage applied to a radiation source that emits the radiation, as one of the imaging conditions.

6. The radiation image processing device according to claim 1,
wherein the processor acquires a signal value output by a dose sensor installed in a direct radiation region in the radiation detector in which the radiation directly reaches, as the reaching dose.

7. A radiation image processing method comprising:
acquiring a reaching dose which is a radiation dose that directly reaches a radiation detector that acquires a plurality of radiation images acquired by imaging a subject with radiation having different energy distributions; and
deriving a subtraction image in which a specific tissue in the subject is extracted by performing predetermined image processing based on the reaching dose, the subtraction image being derived by performing weighting subtraction on the plurality of radiation images,
wherein the method comprises acquiring a signal value output by an image sensor in a direct radiation region in the radiation detector in which the radiation directly reaches, as the reaching dose, and
wherein the method further comprises acquiring a signal value output by a dose sensor installed outside a region in the radiation detector in which the radiation is detected, as the reaching dose.

8. A non-transitory computer-readable storage medium that stores a radiation image processing program causing a computer to execute:
a procedure of acquiring a reaching dose which is a radiation dose that directly reaches a radiation detector that acquires a plurality of radiation images acquired by imaging a subject with radiation having different energy distributions; and
a procedure of deriving a subtraction image in which a specific tissue in the subject is extracted by performing predetermined image processing based on the reaching dose, the subtraction image being derived by performing weighting subtraction on the plurality of radiation images,
wherein the radiation image processing program causes the computer to execute a procedure of acquiring a signal value output by an image sensor in a direct radiation region in the radiation detector in which the radiation directly reaches, as the reaching dose, and
wherein the radiation image processing program causes the computer to execute a procedure of acquiring a signal value output by a dose sensor installed outside a region in the radiation detector in which the radiation is detected, as the reaching dose.

9. A radiation image processing device comprising:
at least one processor,
wherein the processor
acquires a reaching dose which is a radiation dose that directly reaches a radiation detector that acquires a plurality of radiation images acquired by imaging a subject with radiation having different energy distributions,
derives a subtraction image in which a specific tissue in the subject is extracted by performing predetermined image processing based on the reaching dose, the subtraction image being derived by performing weighting subtraction on the plurality of radiation images, acquires the plurality of radiation images,
derives a body thickness distribution of the subject based on the reaching dose, any of the plurality of radiation images, and an imaging condition in a case in which the plurality of radiation images are acquired,
removes a scattered ray component of radiation scattered by the subject from the plurality of radiation images based on the body thickness distribution and the imaging condition,
derives a bone part image in which a bone part of the subject is extracted, by performing the weighting subtraction on the plurality of radiation images from which the scattered ray component is removed,
derives a correction coefficient for correcting a pixel value of the bone part image based on the body thickness distribution and the imaging condition,
derives the subtraction image by correcting the bone part image with the correction coefficient, and
acquires a measured tube voltage output by a tube voltage sensor that measures a tube voltage applied to a radiation source that emits the radiation, as one of the imaging conditions.

* * * * *